United States Patent [19]

Weishew

[11] Patent Number: 5,226,363
[45] Date of Patent: Jul. 13, 1993

[54] DUAL PRESSURE PRELOAD SYSTEM FOR MAINTAINING A MEMBER

[75] Inventor: Joseph J. Weishew, Springfield Township, Montogmery County, Pa.

[73] Assignee: The Langston Corporation, Cherry Hill, N.J.

[21] Appl. No.: 581,340

[22] Filed: Sep. 11, 1990

[51] Int. Cl.$^5$ .................. B41F 31/08; B41F 31/36
[52] U.S. Cl. ..................... 101/366; 101/485
[58] Field of Search ............ 101/152, 153, 157, 118, 101/169, 366, 485; 91/51, 165, 415

[56] References Cited

U.S. PATENT DOCUMENTS

| | | | |
|---|---|---|---|
| 2,376,519 | 5/1945 | Stacy | 91/415 |
| 2,429,390 | 10/1947 | Case | 101/169 |
| 3,128,207 | 4/1964 | Schmitt | 101/169 |
| 3,200,713 | 8/1965 | Viersma et al. | 91/51 |
| 3,327,474 | 6/1967 | Schiffer | 91/415 |
| 4,398,463 | 8/1983 | Yessler | 101/157 |
| 4,463,675 | 8/1984 | Ottenhues | 101/157 |
| 4,515,078 | 5/1985 | Difflipp et al. | 101/157 |
| 4,587,886 | 5/1986 | Masuda et al. | 91/415 |
| 4,716,826 | 1/1988 | Gibellino et al. | 101/169 |
| 4,789,432 | 12/1988 | Goodnow et al. | 101/169 |
| 4,807,517 | 2/1989 | Daeschner | 91/415 |
| 5,003,876 | 4/1991 | Harrison et al. | 101/366 |
| 5,010,817 | 4/1991 | Grosshauser | 101/366 |

FOREIGN PATENT DOCUMENTS

| | | |
|---|---|---|
| 213320 | 6/1960 | Austria ........... 91/415 |
| 641102 | 8/1950 | United Kingdom . |
| 1023830 | 3/1966 | United Kingdom . |
| 1040638 | 9/1966 | United Kingdom . |
| 1316105 | 5/1973 | United Kingdom . |
| 2151551 | 7/1985 | United Kingdom . |

Primary Examiner—J. Reed Fisher
Attorney, Agent, or Firm—Seidel, Gonda, Lavorgna & Monaco

[57] ABSTRACT

A dual pressure preload system preloads a doctor blade assembly in intimate contact with an anilox roll. The doctor blade assembly is attached to at least one end wall of an ink chamber. The ink chamber directly applies ink to the circumferential surface of the roll. A pressure chamber is attached to the ink chamber on the side opposite the roll and maintains the doctor blade assembly adjacent the roll. A differential pressure is produced by the pressure chamber providing a consistent preload force applied to the anilox roll by the doctor blade assembly.

In one embodiment, a relatively compressible fluid, such as a gas, is compressed, which, in turn, acts on a relatively incompressible fluid, such as a liquid, the relative incompressible liquid supplying the pressure in the pressure chamber. In another embodiment, a clamp provides a biasing force, independent of the pressure chamber, for independently preloading the doctor blade assembly in intimate contact with the anilox roll, in the event of a failure of the pressure chamber.

26 Claims, 2 Drawing Sheets

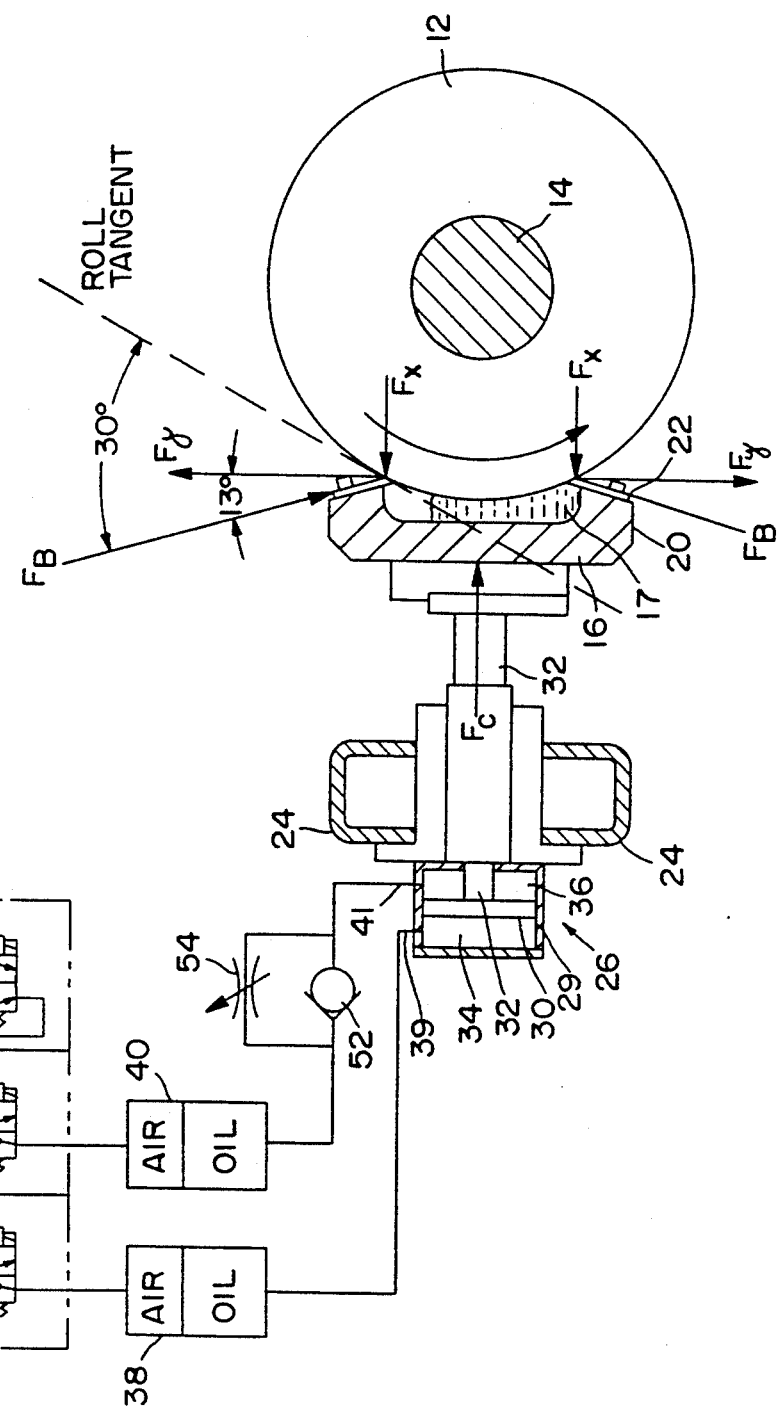

DUAL PRESSURE PRELOAD SYSTEM FOR MAINTAINING A MEMBER

FIELD OF THE INVENTION

This invention is directed to a dual pressure preload system for controlling the force applied to a member, and more specifically a preload system for maintaining a doctor blade assembly in intimate contact with an anilox roll by preloading the blade assembly with a preselected force.

BACKGROUND OF THE INVENTION

Flexography, also referred to as flexographic printing, is a rotary letterpress printing process, traditionally using flexible elastomeric printed rolls and fast-drying inks. Flexographic printing is used for printing flexible packaging materials, including paper and plastic films, multiwall bags, corrugated containers, envelopes and paper-back books. The printing apparatus usually encompasses a reverse-angle doctor blade assembly adjacent an anilox metering roll. The anilox roll typically has approximately 100,000 cells per square inch of surface area dispersed on its outer surface. The ink distribution system operates by flooding the anilox roll with ink, thus flooding the cells on the roll's surface. As the anilox roll rotates, the reverse-angle doctor blade shaves the surplus ink flush with the surface of the cells. The result is a uniformly metered ink film applied by the anilox roll to the surface of the printing roll.

A pressure preload system for a flexographic printer usually places a doctor blade assembly in intimate contact with the outer surface of an anilox roll to control the amount of wiping action applied to the roll's surface. The doctor blade assembly is usually attached to the end wall of an ink chamber located adjacent the circumferential surface of the anilox roll.

A common problem associated with prior art preload systems is the difficulty in applying and maintaining a sufficient force to the doctor blade assembly so that the doctor blade is maintained in intimate contact with the outer surface of the anilox roll. It is crucial that the proper amount of wiping action be applied to the surface of the roll to prevent ink leakage and to achieve the desired printing quality resulting from a uniform application of ink to the printing roll, without causing excessive doctor blade or roll surface wear from unnecessarily large loading forces.

One type of known preload system employs a series of mechanical hand screws which are manually adjusted by an operator to apply a desired force to a doctor blade assembly. The screws are located on the assembly supporting the blade and apply a fixed force to the assembly. A major drawback of this system is that the screws must constantly be manually readjusted by a human operator during operation of the printing press. If the operator incorrectly sets the pressure or there is a sudden change in the conditions of the press, there is a likelihood of premature blade failure or inconsistent wiping action on the roll. There is also an obvious danger of injury to an operator who must adjust the screws while the press is operating.

A second type of known preload device applies a preload force to the doctor blade assembly by using conventional inflatable air pressure tubes or cylinders which must be manually preset by an operator to apply the desired preload force to the doctor blade assembly. The air pressure is normally supplied to the cylinders by the printing plant's in-house air pressure system. Typical air pressure systems are regulated to 50 psi or more. However, only a relatively low pressure is required to provide a preload force sufficient to maintain the doctor blade assembly in intimate contact with the roll. Low pressure air systems, however, are not practical. Inherent in low pressure air supply systems are the difficulties involved in supplying and maintaining a low pressure. Moreover, because air is easily compressible and does not readily transmit compressive forces, there is a risk that the air pressures to be applied to the blade loading system will result in widely variable preload forces on the doctor blade assembly, leading to inconsistent wiping action, excessive wear or ink leakage. Furthermore, if there is a momentary loss or reduction of the plant air pressure, there is a major risk of ink leakage or, in the case of air pressure failure, the ink chamber moving away from the roll resulting in ink flooding. Inconsistencies in the wiping action and blade failures can result in poor quality printing and lower graphic capabilities.

There is a need for a simple but effective system for applying a preload force to a doctor blade assembly that avoids these problems. The present invention fills that need.

SUMMARY OF THE INVENTION

This invention is directed to a dual pressure preload system for applying a preload force to a member. The preload system is preferably used to preload a doctor blade assembly against an anilox roll, but is not strictly limited to this particular application. The preload system can be used in other printing apparatus or any apparatus necessitating the preloading of a member.

In its broadest aspect, the invention is directed to an apparatus for applying to a member a preload force having a selected magnitude and direction. A first force is generated having a component in a preselected direction. A second force is generated having a component in a direction opposite to that of the first force. The magnitudes of the first and second force components are greater than the magnitude of the preload force, and the first force component is greater than the magnitude of the second force component. The preload force is generated as the net vector sum of the first and second force components.

In a preferred embodiment, the invention is directed to a preload system for applying a preload force to a doctor blade assembly to maintain the blade in intimate contact with an anilox roll. An ink chamber having an opening on one side is positioned adjacent a portion of the circumferential surface of an anilox roll along the roll's longitudinal axis. The opening of the ink chamber faces the roll and contains an ink supply. A doctor blade assembly comprising at least one doctor blade is mounted on at least one end wall of the opening of the ink chamber. The free edge of each doctor blade is in intimate contact with the tangential surface of the roll. A pressure chamber attaches to the ink chamber on the side opposite the anilox roll. A reciprocally-movable piston, having a front and back surface, divides the pressure chamber into two smaller compartments. One end of a rod is attached to the back surface of the piston. The first compartment is pressurized to a first preselected pressure, and the second compartment is pressurized to a second preselected pressure. The second pressure is greater than the first pressure. The first and second pressures generate a pressure differential between the two compartments. A net preload force in the direction of the roll is provided by the pressure differential, and is transmitted to the doctor blade assembly to maintain it in intimate contact with the anilox roll.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 2 is a partial sectional view of the preferred embodiment taken along line 2—2 of FIG. 1, and including a schematic representation of certain features of the invention.

DETAILED DESCRIPTION OF THE PREFERRED EMBODIMENT

Figure 1:
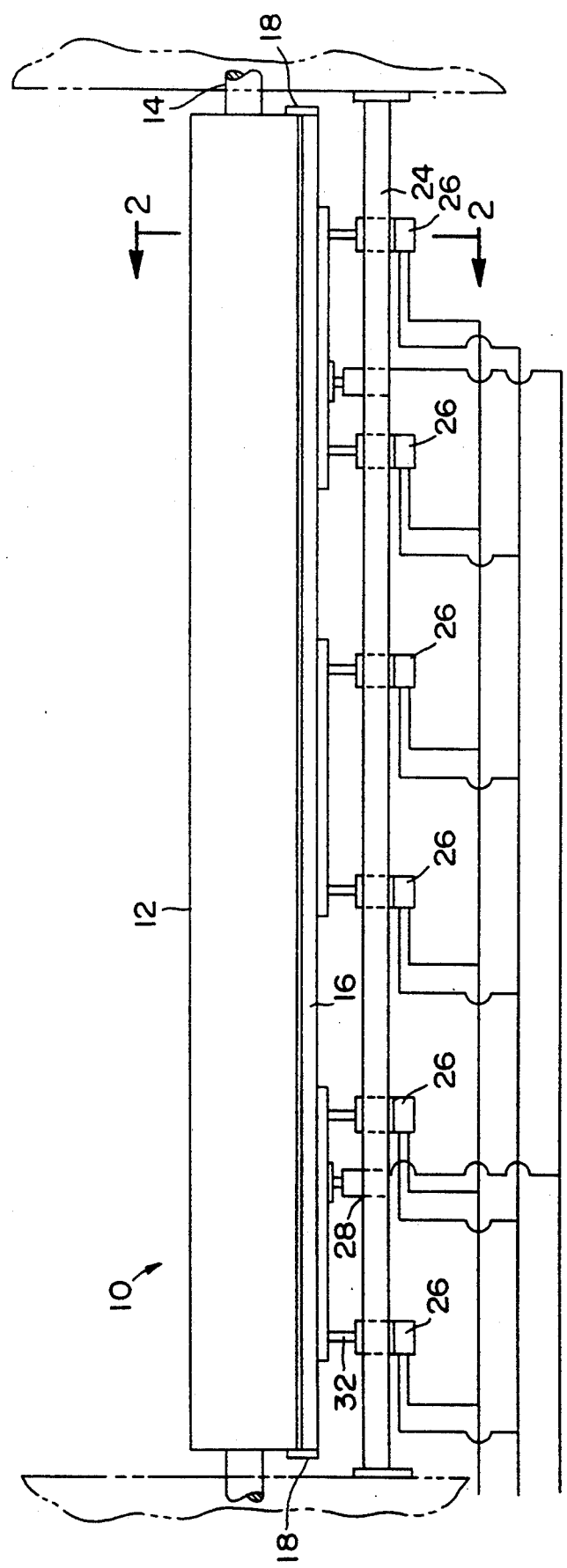
FIG. 1 is a top plan view of a preferred embodiment of an ink metering system employing the invention as described herein.

FIGS. 1 and 2 illustrate an apparatus 10 for applying a preload force to a doctor blade assembly. The apparatus 10 comprises an anilox roll 12 mounted for rotation about its central axis, such as by an axle 14. An ink chamber 16, as described below, is positioned adjacent a portion of the roll's circumferential surface and preferably extends substantially parallel to the longitudinal axis of the roll 12. The ink chamber preferably, but not necessarily, extends along the entire length of the roll 12. Two end seals 18 are positioned at either end of the chamber 16 and preferably are in intimate contact with a portion of the end surfaces of the roll 12 to prevent ink leaking from the ink chamber 16 at the ends of the roll 12.

As seen more clearly in FIG. 2, one side of the ink chamber 16 has an opening which faces the anilox roll 12 and contains an ink supply 17. A doctor blade assembly 22, which extends preferably substantially the length of the ink chamber 16, is attached to at least one end wall 20 of the ink chamber 16 by any suitable means, such as, but not limited to, being welded or bolted on. The doctor blade assembly 22 preferably, but not necessarily, comprises a pair of doctor blades. The doctor blades 22 are angled toward one another with respect to the tangential surface of the roll 12 so that one edge of each blade is in intimate contact with the roll 12.

A cross tie 24 parallel to the circumferential surface of the roll 12 supports a series of pressurized chambers 26. Three pairs of pressurized chambers 26 are evenly spaced along the length of the cross tie 24. The pressurized chambers 26 apply a preload force as described below, along the length of the ink chamber 16 to maintain the doctor blade assembly 22 in intimate contact with the roll surface to provide proper wiping action. Each pressurized chamber 26 is coupled to the ink chamber 16 by a clamp 28. The clamp is preferably, but not necessarily, a conventional scissor clamp. The clamp 28 is pressurized by a pressure source which is preferably independent of the air source to the pressurized chambers 26. The pressure source (not shown) is preferably an air source, but can be any suitable pneumatic or hydraulic source. The clamp 28 also serves to insure that once preloaded against anilox roll 12, the doctor blade assembly 22 will maintain intimate contact with the roll in the event that a plant air pressure failure occurs.

Inside each pressurized chamber 26 is a double acting piston and rod assembly 29. The rod 32 is preferably attached to one side of a piston 30 having a front and back surface, such that the rod 32 is perpendicular to the piston's back surface. The rod 32 extends from the piston surface through the clamp 28 until it is flush with the outer wall of the ink chamber 16. The piston 30 is reciprocally movable and divides pressurized chamber 26 into two separate compartments 34, 36. As the piston 30 moves, it changes the area of each compartment 34, 36. Each compartment 34, 36 is pressurized by its own pressure source produced by first and second pressure cylinders 38, 40 respectively. The pressure cylinders 38, 40 are preferably air-oil cylinders, but could be virtually any type of pressure cylinder, including, but not limited to, a purely pneumatic or hydraulic cylinder. The oil is located in the lower portion of the cylinders 38, 40 and flows into both compartments 34, 36 of the pressurized chamber 26 through inlets 39, 41. The use of a hydraulic fluid such as oil provides a relatively incompressible fluid, which in turn provides an immediate and uniform force in the direction of the doctor blades 22. A hydraulic system is preferred over a purely pneumatic assembly which has a great deal of compliance and could provide only a delayed and variable force, due to a pneumatic fluid's compressible nature.

An air supply 46 supplies air to each pressure cylinder 38, 40. The air supply 46 is preferably the printing plant's air pressure system, but pressurized air can be supplied from any suitable source. Located between the air supply 46 and each pressure cylinder 38, 40 are conventional pressure regulators 42, 44. The air sent to the regulators is monitored by pressure gauges 48, 50. The pressure regulators 42, 44 are arranged in parallel so that a desired air pressure is applied to both pressure cylinders 38, 40. Because both cylinders 38, 40 are supplied by a single air source 46, the pressure applied to each cylinder 38, 40, will be approximately the same. If there is a change in the pressure being supplied to the regulators 42, 44 there will be a corresponding proportional drop in the pressure sent to each cylinder 38, 40. The regulators are adjusted so that there will be a small pressure differential between the pressure received by the first cylinder 38 and the second cylinder 40. Because of this relationship between the first and second cylinders 38, 40, a constant pressure differential value can be maintained between the first and second compartments. For example, a pressure differential of 5 psi could be maintained between the pressure cylinders regardless of the actual individual air pressures received by each cylinder 38, 40.

The pressure differential is necessary to produce a net preload force against the anilox roll. Since the rod 32 is attached to one side of the piston, the areas of the piston surfaces are not equal. Defining the piston surface facing the first compartment 34 as the front surface, and the piston surface facing the second compartment 26 as the back surface, the presence of the rod 32 results in the piston having a smaller back surface area relative to the front surface area. In order to produce a net preload force in the direction of the anilox roll, different pressures must be applied to each piston surface. As is well known, the force applied to the piston's surface is proportional to the pressure operating on each piston surface multiplied by the piston surface area. A greater pressure must be applied to the piston's back surface relative to the piston's front surface to produce the desired pressure differential resulting in a net preload force acting against the anilox roll.

The resulting net preload force produced in the direction of the roll 12 causes the doctor blades 22 to be in intimate contact with the roll 12. The air-oil cylinders 38, 40 provide a substantially incompressible system which is capable of transmitting an evenly applied force from a relatively small net pressure. In this case, the net force is the result of a pressure differential produced in the pressure chamber 26 which is sufficient to maintain the doctor blades 22 in intimate contact with the roll 12.

The use of a pressure differential to preload the doctor blades 22 allows a high air pressure to be used to achieve a low net force by reverse pressurizing one side of the cylinder. Adjustment to the system can be factory preset so that no operator air adjustments will be required.

Because the pressurized chambers 26 are uniformly spaced along the outer wall 21 of the ink chamber, a constant force is applied to the doctor blade assembly 22.

The force to be applied to the doctor blade assembly 22 can be determined from the general relationship $$F_C = (P_1 A_1 - P_2 A_2) N \quad (1)$$

in which
- $P_1$ = first pressure
- $A_1$ = area of cylinder piston
- $P_2$ = second pressure
- $A_2$ = area of effective piston-rod end
- $N$ = number of cylinders
- $F_c$ = total pre-load force.

The total preload force can also be determined by the following equation:

$$F_c = 2(l) F_B \sin \theta \quad (2)$$

wherein
- l = blade length
- $F_B$ = axial blade load/inches of length
- N = number of cylinders
- $\Theta$ = the angle between the y component of the blade force and the resultant component of the blade force as seen in FIG. 2.

By substituting equation (2) into equation (1), the second pressure $P_2$ can be calculated, given the known desired preload force, first pressure and $\Theta = 13°$ as follows:

$$P_2 = P_1 A_1/A_2 - 2(l) F_B \sin 13°/ N A_2 \quad (3)$$

The above described arrangement provides a constant pressure differential between the first and second pressure compartments 34, 36 regardless of the pressure transmitted by the air supply 46. This results in a constant force being applied to the doctor blade assembly 22 which provides consistent wiping action to the roll 12 and allows for better overall printing quality and higher graphic capabilities.

The ink metering system operates in the following manner. As an illustrative example, values have been given to various parameters such as the pressure and the radii of the piston and rod. However, these values are not intended to limit the scope of the invention. A common air supply 46 provides an air pressure to first and second pressure regulators 42, 44 placed in series relative to one another. Each pressure regulator 42, 44 is connected to first and second pressure cylinders 38, 40.

The pressure regulators 42, 44 are adjusted so that a greater pressure is transmitted to the second pressure cylinder 40 relative to the first pressure cylinder 38. The first and second pressure cylinders 38, 40 are connected to a pressure chamber containing a piston and rod assembly 29. The slidable piston 30 divides the pressure chamber 26 into two smaller compartments 34, 36 with the rod end being connected to one of the piston surfaces and contained within the second compartment 36.

The second compartment 36 is pressurized by the second cylinder 40 at a pressure of 54.7 psi, for example, and the first compartment 34 is pressurized by the first cylinder 38 to a pressure of 50 psi. Due to the presence of the rod 32 on one side of the piston surface, the area of the piston surface in the second compartment 36 is smaller than the area of the piston surface in the first compartment 34 by the surface area of the rod end. When the pressure chamber 26 receives the pressures produced by the first and second pressure cylinders 38, 40 a pressure differential is created inside the pressure chamber.

If the radius of the piston surface was 1 in for example, then the area of the front surface area would be the following:

$$\begin{aligned} A_1 &= \pi r_1^2 \\ &= \pi (1)^2 \\ &= 3.14159 \text{ in.}^2 \end{aligned} \quad (4)$$

wherein $r_1$ = piston radius

Likewise, if the radius of the rod is 0.3125 in. then the area of the expose back surface area of the piston is as follows:

$$\begin{aligned} A_2 &= \pi r_2^2 - \pi r_{rod}^2 \\ A_2 &= \pi (r_2^2 - r_{rod})^2 \\ &= \pi (1 - 0.0976) \\ &= 2.83759 \text{ in.}^2 \end{aligned} \quad (5)$$

wherein
- $r_2$ = piston radius
- $r_{rod}$ = rod radius

The resulting forces acting on each piston surface are as follows:

$$\begin{aligned} F_1 &= P_1 A_1 \\ &= 50(3.14159) \\ &= 157.08 \text{ lb} \end{aligned} \quad (6)$$

$$\begin{aligned} F_2 &= P_2 A_4 \\ &= 54.7(2.83759) \\ &= 155.05 \text{ lb} \end{aligned} \quad (7)$$

By substituting equations (6) and (7) into equation (1) the resulting preload force is as follows:

$$F_C = (F_1 - F_2) N$$

If N = 6, as shown in the drawings, $$F_C = (157.08 - 155.05) \times 6 \quad (8)$$

$$F_C = 12.18 \text{ lb}$$

As can be seen from the example the resulting preload force is much smaller than the forces in either compartment.

As described above, the net preload force is applied by rod 32, which is attached to the outer wall 21 of the ink chamber. A series of pressure chambers 26 are linearly distributed across the chamber's outer wall 16. Attached to each end wall of the ink chamber 16 is a doctor blade 22. The ink chamber 16 is adjacent an anilox roll 12 with the edge of the doctor blades in intimate contact with the roll's surface. The force produced by the pressure chamber 26 is applied to the outer wall of the ink chamber 16 which places a constant preload force on the doctor blades to maintain the blades in intimate contact with the roll.

In the event of plant pressure failure, safety features are placed in series with the second pressure cylinder 40. A check valve 52 prevents the back flow of hydraulic fluid in the event of plant pressure failure and during normal printing operations. A restrictor valve 54 retards the flow of hydraulic fluid in the event of a plant failure to delay the inevitable loss in pressure which occurs as a result of the failure.

The present invention may be embodied in other specific forms without departing from the spirit or essential attributes thereof and, accordingly, reference should be made to the appended claims, rather than to the foregoing specification, as indicating the scope of the invention.

I claim:

1. Apparatus for applying to a doctor blade assembly a preload force having a preselected magnitude and direction for urging the doctor blade into contact with a printing roller, comprising a doctor blade assembly to be subjected to a preload force, an inking roller, first means for pressurizing a first volume of a relatively compressible first fluid in contact with a first volume of a relatively incompressible second fluid, the first volume of said relatively incompressible second fluid being thereby subjected to a first pressure, means for using said first pressure to generate a first force having a component in said preselected direction, said preselected direction being substantially along a radius of said inking roller, second means for pressurizing a second volume of a relatively compressible first fluid in contact with a second volume of a relatively incompressible second fluid, the second volume of said relatively incompressible second fluid being thereby subjected to a second pressure, means for using said second pressure to generate a second force having a component in a direction opposite to the direction of said first force, the magnitudes of said first and second force components both being greater than the magnitude of the preload force and the magnitude of the first force component being greater than the magnitude of the second force component, means responsive to said first and second forces for generating said preload force as the net vector sum of said first and second force components, and means for transmitting said preload force to said doctor blade assembly.

2. Apparatus according to claim 1 wherein said first and second force generating means are pressure cylinders.

3. Apparatus according to claim 2 wherein said pressure cylinders are pneumatic-hydraulic cylinders.

4. Apparatus for generating a preload force on a doctor blade assembly in a printing press for urging said assembly substantially radially toward an inking roller, comprising (a) a doctor blade assembly,
(b) chamber means,
(c) piston means reciprocally movable in the chamber means, the piston means having a front surface and a back surface, the area of the front surface being greater than the area of the back surface, the back surface having one end of a piston rod thereon, the other end of the piston rod being connected to the doctor blade assembly,
(d) first means for pressurizing a first volume of a relatively compressible first fluid in contact with a first volume of a relatively incompressible second fluid, the first volume of said relatively incompressible second fluid being thereby subjected to a first force,
(e) second means for pressurizing a second volume of a relatively compressible first fluid in contact with a second volume of a relatively incompressible second fluid, the second volume of said relatively incompressible second fluid being thereby subjected a second force,
(f) means for using said first force to apply a first pressure to the front surface of the piston means, and
(g) means for using said second force to apply a second pressure to the back surface of the piston means,
said pressures and the areas of said surfaces being chosen to produce a net preload force along the piston road toward said doctor blade assembly.

5. Apparatus according to claim 4 wherein said means for applying a first and second pressure are pressure cylinders.

6. Apparatus according to claim 5 wherein said pressure cylinders are hydraulic-pneumatic cylinders.

7. Apparatus for applying a preload force having a preselected magnitude and direction to a doctor blade assembly in a printing press for urging said doctor blade assembly substantially radially toward an inking roller, comprising (a) a doctor blade assembly,
(b) cylinder means,
(c) a piston reciprocally movable within the cylinder means, the piston dividing the cylinder means into two chambers, the piston face having a preselected surface area and defining one wall of a first chamber and the piston tail having a surface area less than the surface area of the piston face and defining one wall of a second chamber;
(d) a piston rod extending from the piston tail through the second chamber to said doctor blade assembly,
(e) first means for pressurizing a first volume of a relatively compressible first fluid in contact with a first volume of a relatively incompressible second fluid, the first volume of said relatively incompressible second fluid being thereby subjected to a first force,
(f) second means for pressurizing a second volume of a relatively compressible first fluid in contact with a second volume of a relatively incompressible second fluid, the second volume of said relatively incompressible second fluid being thereby subjected to a second force,
(g) means for using said first force to pressurize the first chamber to a first preselected pressure, and (h) means for using said second force to pressurize the second chamber to a second preselected pressure, said surface area and said pressures being preselected to produce a preload force along the piston rod in a direction toward said doctor blade assembly.

8. Apparatus according to claim 7 wherein said first and second pressurizing means includes pressure cylinders.

9. Apparatus according to claim 8 wherein said pressure cylinders are hydraulic-pneumatic cylinders.

10. A dual pressure preload system for applying a preload force to a doctor blade assembly to maintain the doctor blade assembly in intimate contact with an anilox roll, comprising:

an anilox roll;
an ink chamber having an opening on one side and adjacent a portion of the circumferential surface of said roll, the opening of said chamber facing said roll and containing an ink supply;
a doctor blade assembly comprising at least one doctor blade, said at least one doctor blade being positioned at a reverse angle relative to the tangential surface of said roll and mounted on an end wall of said chamber such that the edge of said blade is in intimate contact with said roll;
at least one pressure chamber attached to said ink chamber on the side opposite said roll;
a movable piston and rod assembly positioned within said at least one pressure chamber, said piston having a front and back surface and dividing said pressure chamber into first and second smaller compartments, wherein said rod is positioned within said second compartment and one end of said rod is attached to the back surface of said piston and perpendicular with respect to said piston surface;
a pressurized clamp for maintaining said blade in intimate contact with said roll;
air supply means for pressurizing said clamp;
first means for pressurizing said first compartment;
second means for pressurizing said second compartment, said pressure in said second compartment being greater than said pressure in said first compartment; and
regulating means for maintaining a constant pressure differential between said first and second pressurizing means, wherein said pressure differential results in a net preload force being applied along the rod to the doctor blade assembly.

11. A system according to claim 10 wherein said first and second pressurizing means includes pressure cylinders.

12. A system according to claim 11 wherein said pressure cylinders are pneumatic-hydraulic cylinders.

13. A system according to claim 12, further comprising a single air supply connected to said first and second pressurizing means, wherein said regulating means are positioned between said air supply and said first and second means.

14. A dual pressure preload system comprising:
a member to be subjected to a preload force;
preloading means for applying said preload force to said member, said preloading means being in intimate contact with said member;
support means for supporting said preloading means and maintaining said preload means in intimate contact with said member;
at least one pressure chamber attached to said supporting means on the side opposite said member
a movable piston and rod assembly positioned within said pressure chamber, said piston having a front and back surface, wherein one end of said rod is connected to the back surface of said piston, dividing said pressure chamber into first and second smaller compartments;
a pressurized clamp for maintaining said preloading means in intimate contact with said member;
a first pressure means for pressurizing said first compartment;
a second pressure means for pressurizing said second compartment, wherein said second pressurizing means is greater than said first pressure means resulting in a net pressure differential;
a pressure source for supplying a pressure to said first and second pressure means;
regulating means for regulating said pressure differential, wherein said differential pressure produces the net preload force for maintaining said preloading means in intimate contact with said member;
and a separate air source for pressurizing said clamp.

15. A system according to claim 14 wherein said regulating means further comprises:
independent regulating means for regulating the amount of pressure received in said first and second compartment by said first and second pressure means, said regulating means positioned between said pressure means and said first and second pressure means, wherein a constant pressure differential is maintained between said first and second pressure means, to provide a force which maintains the doctor blade assembly in intimate contact with the roll.

16. A system according to claim 14 wherein said preloading means is a doctor blade assembly.

17. A system according to claim 14 wherein said member is an anilox roll.

18. A system according to claim 14 wherein said support means is an ink chamber.

19. An apparatus according to claim 14, wherein said first and second pressure means includes pressure cylinders.

20. An apparatus according to claim 19, wherein said first and second pressure means include pneumatic-hydraulic cylinders.

21. An apparatus according to claim 15, wherein said regulating means further comprises a first regulating means for regulating said first pressure means said first regulating means positioned between said pressure source and said first pressure means, and a second regulating source for regulating said second pressure source, said second regulating means positioned between said pressure source and said second pressure means.

22. In a printing press comprising an anilox roll, an ink chamber having an opening on one side and being adjacent a portion of the circumferential surface of said roll, the opening of said chamber facing said roll and containing an ink supply, a doctor blade assembly comprising at least one doctor blade, said at least one doctor blade positioned at a reverse angle relative to the tangential surface of said roll and mounted on an end wall of said chamber such that the edge of said at least one blade is in intimate contact with said roll, first force creating means for pressurizing a first volume of a relatively compressible first fluid in contact with a first volume of a relatively incompressible second fluid, the first volume of said relatively incompressible second fluid being thereby subjected to a force exerted by said relatively compressible first fluid, thereby creating said first force, second force creating means for pressurizing a second volume of a relatively compressible fluid in contact with a second volume of a relatively incompressible second fluid, the second volume of said relatively incompressible fluid being thereby subjected to a force exerted by said relatively compressible second fluid, thereby creating said second force, at least one pressure chamber attached to said ink chamber on a side opposite said roll, a movable piston and rod assembly positioned within said pressure chamber and dividing said chamber into two smaller compartments, a first pressure means received in said first compartment, a second pressure means received in said second pressure compartment, said second pressure means being proportionally greater than said first pressure means, and regulating means connected to said first and second force creating mean for maintaining a constant force differential between said two force creating means, a method for preloading a doctor blade assembly in intimate contact with an anilox roll comprising:

providing a common air pressure supply to said regulating means; said regulating means supplying a first pressure to said first volume of said relatively compressible first fluid and a second pressure to said second volume of said relatively compressible second fluid wherein said second pressure is larger than said first pressure;

establishing a constant force differential between said first and second force creating means;

transmitting said first and second forces to said pressure chamber, wherein said first force creates a proportional first pressure which is received by said first compartment and said second force creates a proportional second pressure which is received by said second compartment;

establishing a net preload force due to the pressure differential between said first and second pressures in a direction toward said second compartment, wherein said preload force is applied to said doctor blades via said ink chamber to maintain said doctor blades in intimate contact with said roll.

23. A method according to claim 22 wherein said first and second pressure means include pneumatic-hydraulic cylinders.

24. A method according to claim 22 wherein said regulating means further comprises a first regulating means for regulating said first pressure means and a second regulating means for regulating said second pressure source.

25. A method for applying to a doctor blade assembly a preload force having a preselected magnitude and direction for urging the doctor blade into contact with a printing roller, comprising the steps of:

generating a first force by pressurizing a first volume of a relatively compressible first fluid in contact with a first volume of a relatively incompressible second fluid, the first volume of said relatively incompressible second fluid being thereby subjected to said first force having a component in said preselected direction;

generating a second force by pressurizing a second volume of a relatively compressible first fluid in contact with a second volume of a relatively incompressible second fluid, the second volume of said relatively incompressible second fluid being thereby subjected to said second force having a component in a direction opposite to the first direction, wherein the magnitudes of said first and second force components are both greater than the magnitude of the preload force;

generating a preload force in response to said first and second force components as the net vector sum of said first and second force components; and transmitting said preload force to said doctor blade assembly for urging said doctor blade substantially radially toward said printing roller.

26. A dual pressure preload system comprising a member to be subjected to a preload force;

preloading means for applying said preload force to said member, said preloading means being in intimate contact with said member;

support means for supporting said preloading means and maintaining said preload means in intimate contact with said member;

at least one pressure chamber attached to said supporting means on the side opposite said member;

a movable piston and rod assembly positioned within said pressure chamber, said piston dividing said pressure chamber into first and second smaller compartments and having a front and back surface, one end of said rod being connected to the back surface of said piston;

a first pressure means for pressurizing said first compartment to produce a first predetermined force on said piston;

a second pressure means for pressurizing said second compartment to produce a second predetermined force on said piston which is smaller than said first predetermined force;

a pressure source for supplying a pressure to said first and second pressure means;

regulating means for regulating said first and second pressure means whereby the difference between the first and second forces acts to urge said preloading means into intimate contact with said member; and a pressurized clamp cooperable with said preloading means for insuring that said preloading means remains in intimate contact with said member.

* * * * *